(No Model.)  J. E. BALL. THRASHING MACHINE.  2 Sheets—Sheet 1.
No. 469,461.  Patented Feb. 23, 1892.
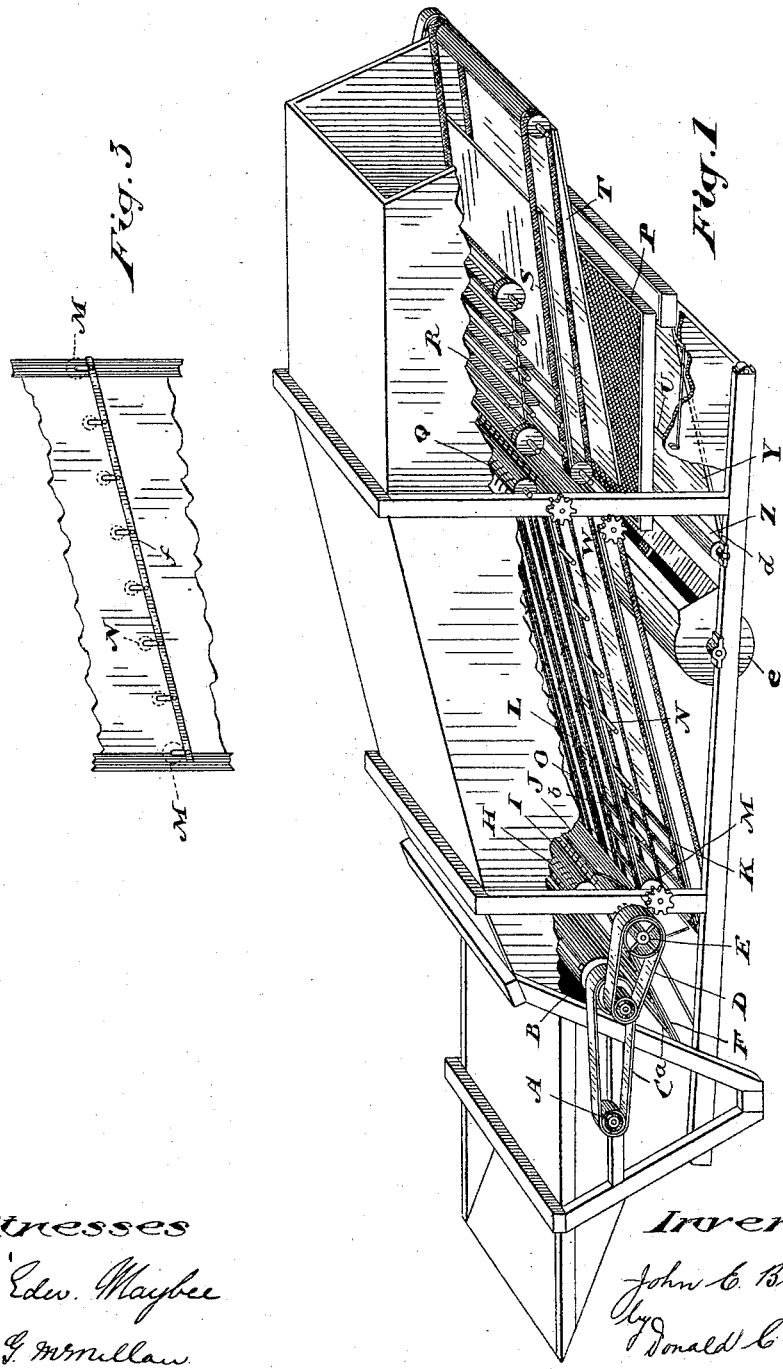
Witnesses
J. Edw. Maybee
H. G. McMillan
Inventor
John E. Ball
by Donald C. Ridout & Co
Attys.

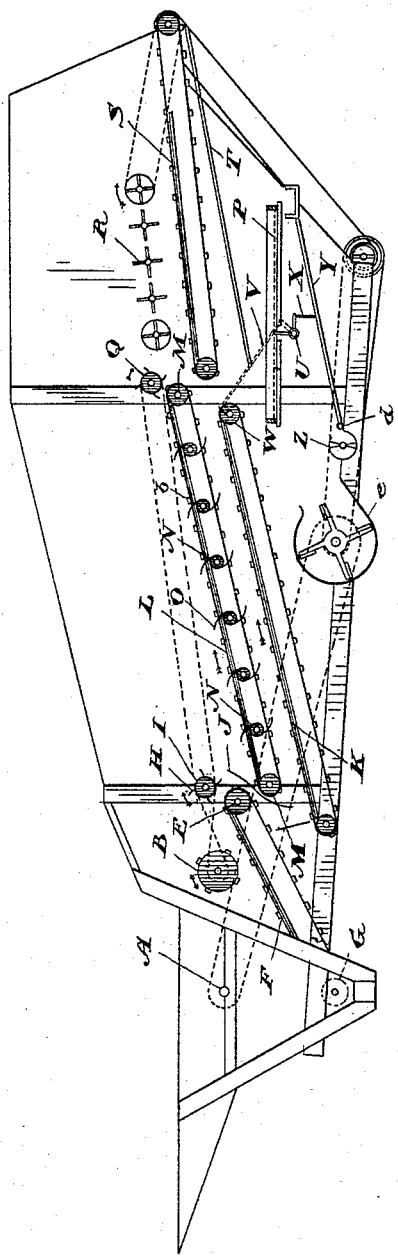

UNITED STATES PATENT OFFICE.

JOHN EDWARD BALL, OF CARTWRIGHT, CANADA.

THRASHING-MACHINE.

SPECIFICATION forming part of Letters Patent No. 469,461, dated February 23, 1892.

Application filed May 2, 1891. Serial No. 391,344. (No model.)

*To all whom it may concern:*

Be it known that I, JOHN EDWARD BALL, of the township of Cartwright, in the county of Durham, in the Province of Ontario, Canada, have invented a certain new and useful Improvement in Thrashing-Machines, of which the following is a specification.

The object of the invention is to construct a thrashing-machine in which the grain will be thoroughly separated from the straw without any violent vibratory movement of the machine; and it consists in the peculiar construction, arrangement, and combination, of parts hereinafter more particularly described, and then definitely claimed.

Figure 1 is a perspective view of the machine partially broken away to expose its interior construction. Fig. 2 is a section side elevation of the machine. Fig. 3 is a detail showing the manner of driving the revolving kickers.

A is the spindle of the thrashing-cylinder, and B the beater, the two being connected together by a belt C.

D is a belt, which connects the spindle of the beater B to the spindle of the roller E, on which the endless belts F are carried over a suitable floor, as shown. These belts F pass around a roller G, situated below the cylinder A, as indicated. A series of slats $a$ are arranged across the belts F for the purpose of carrying the grain falling from the thrashing-cylinder A. The straw and grain which fall from the cylinder A are carried by the slats $a$ and belts F past the beater B. When the straw reaches the roller E, it is met by the revolving kicker, which consists of a series of curved fingers H, extending from the roller I, which is caused to revolve in the direction indicated by arrow. This kicker shakes up the straw and separates from the straw a large portion of the grain, which drops on the plate J, which carries it to the traveling belt K. The straw passes over the kicker H and the plate J to the traveling belt L. This belt is supported by the rollers M, which are properly geared to revolve, so as to cause the belt L to travel in the direction indicated by arrow. Between the rollers M a series of rollers N are arranged, from which rollers a series of curved fingers O project and extend through longitudinal openings made in the belt L, or, in other words, the belt L is made in strips, so that the fingers O may project through and in revolving agitate and shake up the straw on the belt L, so as to separate the grain, which falls between the cross-strips $b$ and is discharged over the upper roller M on the sieve P, on which sieve the grain carried by the traveling belt K is likewise deposited. Immediately over the upper roller M, I locate a kicker Q, made in the same way as the other kickers already described, and, like the kicker over the roller G, caused to revolve by a belt extending from the beater B. The kicker Q revolves in the direction indicated by arrow, and besides shaking up the straw assists in carrying it toward the revolving beaters R, which still further agitate the straw until it is finally discharged from the machine. The kicker Q and the beaters R effectually separate from the straw whatever grain may be left on the traveling slat belt S, from which it falls, as indicated by arrows, on the slanting board T, which conveys it to the sieve P. Any straw which may have fallen on the belt S will be conveyed by it out of the machine. The sieve P is suitably supported on strips tacked to the sides of the machine, and said sieve derives a reciprocating motion from the crank-shaft U, driven by a pitman V, connected to the crank fixed to the roller W. An arm on the crank-shaft U is connected by a rod X to the slanting board Y. This slanting board is hinged at $d$, so that the movement of the crank-shaft U gives the said board a rocking movement. The grain which falls through the sieve P is carried by the board Y to the conveyer Z.

E is a blast-fan located and arranged for the same purpose as similar fans in other thrashers.

On reference to Fig. 3 it will be noticed that the spindles of the rollers N are cranked and connected together by a rod $f$, so that all the rollers will revolve together, and it will also be seen that the straw-carrier belt L has the additional function of enforcing the rotation of the shafts connected with its pulleys by means of the cranks and said rod $f$.

I do not claim any peculiarity in the mechanism for conveying motion to the various parts of the machine, as the said mechanism may easily be arranged to suit the taste of the manufacturer without in any way altering the intention or result of my invention. I may, however, mention that as I now build the machine I place a sprocket-wheel on the spindle of the roller E and connect the rollers of the belts K and L to the roller E by means of the sprocket-chain. From this description it will be seen that I provide a machine in which the straw will be thoroughly shaken up in passing through it and that by the means described I secure a thorough separation of the grain from the straw without the violent vibratory motion which is so objectionable in and injurious to thrashing-machines provided with vibratory straw and grain decks.

What I claim as my invention is—

1. In a thrashing-machine, the endless traveling belt L and rollers M for supporting the same and having crank-arms, in combination with a series of rollers N, also having crank-arms, kickers O on said rollers N, projecting through said belt L, and the rod $f$, connected to the cranks of said rollers M and N, whereby the motion of the belt L in passing around the rollers M imparts motion to the kickers by the aid of the cranks and rod $f$ and the straw is fed forward by the conjoint action of the belt and kickers, substantially as described.

2. In a thrashing-machine, the reciprocating sieve P, suspended below the slanting board T, in combination with the crank-shaft U, having one arm giving a reciprocating motion to the sieve P and the other to rod X, hinged slanting board Y, connected by the rod X to the crank-shaft U, pitman V, and roller W, all substantially as described and shown.

Toronto, April 25, 1891.

JOHN EDWARD BALL.

In presence of—
CHARLES C. BALDWIN,
JOHN E. CAMERON.